(12) United States Patent
Perry et al.

(10) Patent No.: US 9,321,891 B2
(45) Date of Patent: Apr. 26, 2016

(54) ENCAPSULATED FLEXIBLE POLYURETHANE FOAM AND METHOD FOR MAKING POLYOL TO FORM FOAM

(75) Inventors: Christine Perry, Gibraltar, MI (US); Cynthia Flanigan, Canton, MI (US); Deborah Mielewski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/538,610

(22) Filed: Jun. 29, 2012

(65) Prior Publication Data

US 2012/0295998 A1 Nov. 22, 2012

Related U.S. Application Data

(63) Continuation of application No. 11/164,560, filed on Nov. 29, 2005, now abandoned.

(51) Int. Cl.
*C08J 9/14* (2006.01)
*C08G 18/36* (2006.01)
*C08G 101/00* (2006.01)

(52) U.S. Cl.
CPC ............ *C08J 9/142* (2013.01); *C08G 18/36* (2013.01); *C08G 2101/00* (2013.01); *C08J 2375/04* (2013.01)

(58) Field of Classification Search
CPC ..... C08G 18/36; C08G 2101/00; C08J 9/142; C08J 2375/04
USPC ............. 521/170, 172; 560/1, 2; 252/182.24, 252/182.27, 182.28
See application file for complete search history.

(56) References Cited

U.S. PATENT DOCUMENTS

| | | | |
|---|---|---|---|
| 2,674,609 A * | 4/1954 | Beal et al. | 203/63 |
| 2,752,376 A | 6/1956 | Julian | |
| 2,833,730 A * | 5/1958 | Barthel, Jr. | 521/159 |
| 3,330,782 A | 7/1967 | Poppelsdorf | |
| 4,297,292 A * | 10/1981 | Logan et al. | 554/187 |
| 4,430,484 A | 2/1984 | Quinn | |
| 5,094,775 A | 3/1992 | Bailey, Jr. | |
| 5,482,980 A | 1/1996 | Pcolinsky | |
| 5,710,190 A | 1/1998 | Jane et al. | |
| 5,750,583 A | 5/1998 | Gansen et al. | |
| 6,051,622 A | 4/2000 | Kinkelaar et al. | |
| 6,127,443 A * | 10/2000 | Perry et al. | 521/137 |
| 6,180,686 B1 | 1/2001 | Kurth | |
| 6,420,443 B1 | 7/2002 | Clark et al. | |
| 6,458,860 B1 | 10/2002 | Humbert et al. | |
| 6,476,244 B2 * | 11/2002 | Mahlum | 554/183 |
| 6,624,244 B2 | 9/2003 | Kurth | |
| 6,649,667 B2 | 11/2003 | Clatty | |
| 7,129,291 B2 | 10/2006 | Blount | |
| 2002/0009230 A1 | 1/2002 | Sun et al. | |
| 2002/0058774 A1 | 5/2002 | Kurth et al. | |
| 2002/0099230 A1 | 7/2002 | Ramirez-de-Arellano-Aburto et al. | |
| 2002/0121328 A1 | 9/2002 | Kurth et al. | |
| 2002/0192456 A1 | 12/2002 | Mashburn et al. | |
| 2003/0083394 A1 | 5/2003 | Clatty | |
| 2003/0105178 A1 | 6/2003 | Kurth | |
| 2003/0143910 A1 | 7/2003 | Mashburn et al. | |
| 2003/0166735 A1 | 9/2003 | Clatty | |
| 2003/0191274 A1 | 10/2003 | Kurth et al. | |
| 2004/0082712 A1 | 4/2004 | Blount | |
| 2005/0070620 A1 | 3/2005 | Herrington et al. | |
| 2006/0205890 A1 | 9/2006 | Sasagawa et al. | |
| 2006/0235100 A1 | 10/2006 | Kaushiva et al. | |
| 2006/0270747 A1 | 11/2006 | Griggs | |
| 2006/0276609 A1 | 12/2006 | Lysenko et al. | |
| 2007/0066697 A1 | 3/2007 | Gilder et al. | |
| 2007/0078193 A1 | 4/2007 | Gilder et al. | |
| 2007/0105970 A1 | 5/2007 | Warnshuis et al. | |
| 2007/0175793 A1 | 8/2007 | Narine et al. | |
| 2010/0249260 A1 | 9/2010 | Casati et al. | |

FOREIGN PATENT DOCUMENTS

| | | |
|---|---|---|
| EP | 1264850 A1 | 11/2002 |
| EP | 1712578 A1 | 10/2006 |
| JP | 2005320431 A | 11/2005 |
| WO | 03078493 A2 | 9/2003 |
| WO | 2005000934 A1 | 1/2005 |
| WO | 2005033167 A2 | 4/2005 |
| WO | 2005123798 A1 | 12/2005 |
| WO | 2006023798 A2 | 3/2006 |

OTHER PUBLICATIONS

Gangidi et al.; Lipids; (2004); 39(6): 577-82.*
Davidson; Carl Zeiss Microscopy Online Campus—Fundamentals of Mercury Arc Lamps (2013).*
Soy-Based Polymer in Production, Can Revolutionize Polyurethane Industry, United Soybean Board, vol. 4, Issue 4, Jul. 1999, pp. 1-4.
Schut, Jar H., Polyurethane Foam Industry Prepares for Zero CDP, Plastics Technology Online Article, pp. 1-3.
New Soy Bio-Based Chemical Feedstocks (Polyols), The Soy Daily, Jun. 9, 2004, pp. 1-5.
Jones, Richard G., et al., Silicon-Containing Polymers—The Science and Technology of Their Synthesis and Applications, Kluwer Academic Publishers 2000, pp. 1-3.
Modesti, M., et al., Formic Acid as a Co-Blowing Agent in Rigid Polyurethane Foams, European Polymer Journal, vol. 34., No. 9, 1998, pp. 1233-1241.

* cited by examiner

*Primary Examiner* — John Cooney
(74) *Attorney, Agent, or Firm* — Damian Porcari; Brooks Kushman P.C.

(57) ABSTRACT

A cellular material. The cellular material can be the reaction product of a vegetable-based polyol made from a vegetable oil exposed to ultraviolet (UV) light, wherein a free radical oxidation reaction is catalyzed by the UV light and the vegetable oil is converted into the vegetable-based polyol; and an isocyanate.

20 Claims, 3 Drawing Sheets

United States Patent US 9,321,891 B2

ENCAPSULATED FLEXIBLE POLYURETHANE FOAM AND METHOD FOR MAKING POLYOL TO FORM FOAM

CROSS-REFERENCE TO RELATED APPLICATIONS

This application is a continuation of U.S. application Ser. No. 11/164,560 filed Nov. 29, 2005.

BACKGROUND

1. Field of the Invention

One aspect of the present invention relates to flexible polyurethane foam suitable for use in automobile interior applications, and method for making vegetable-based polyol to form foam.

2. Background Art

Flexible polyurethane foams have been extensively used in the automotive industry for applications such as seating, instrument panels, armrests, headrests and headliners. On average, 35 pounds of flexible polyurethane foam are used per vehicle for interior applications.

The production of polyurethane foams is well known in the art. Polyurethanes are formed when isocyanate (NCO) groups react with hydroxyl (OH) groups. One common method of polyurethane production includes the reaction of a polyol with OH groups and an isocyanate with NCO groups, which forms the backbone urethane group.

A blowing agent can be added to the reaction to cause gas or vapor to be evolved during the reaction. The blowing agent creates void cells in the final foam, and commonly is a solvent with a relatively low boiling point or is water. As the polyurethane reaction proceeds and the material solidifies, the vapor gas bubbled from the blowing agent are locked into place to form void cells. Varying the amount or type of blowing agent used may control the final polyurethane foam density and properties.

Other conventional components such as cross-linking agents and catalysts are often used in standard foam formulations. A cross-linking agent promotes chemical cross-linking to result in a structured final urethane product. A catalyst controls reaction kinetics to help tailor the final product qualities.

Polyols commonly used in the reaction are typically derived from petrochemicals, for example, glycerin and ethylene oxide. The use of petrochemical polyols is disadvantageous for a variety of reasons. First, since polyols are derived from petroleum, they are a non-renewable resource. Furthermore, the production of a polyol may require a great deal of energy and expense, as oil must be drilled, extracted from the ground, transported to refineries, refined, and otherwise processed to yield the polyol.

With uncertainties in the long-term economic stability and limited reserves of fossil fuels and oils, investigations into using renewable resources as a source for foams have been ongoing. As part of that investigation, soy-based polyols have been developed as an alternative to petroleum-based polyols. The soy-based polyols are considered a good alternative to petroleum-based polyols for the production of polyurethane foam since the soy-based polyols can offer cost advantages as well as alleviate the environmental concerns associated with petroleum-based polyols. Examples of the use of soy-based polyols to formulate soy-based polyurethane foams can be found in U.S. Patent Application Nos. 2002/009230, 2002/0192456, 2003/0083394 and U.S. Pat. Nos. 5,710,190 and 6,624,244.

In the manufacture of soy-based polyols, any combination of the following steps is commonly utilized: blowing air through a soy oil, heating the soy oil to an elevated temperature over room temperature and/or adding a catalyst to promote reaction in the soy oil.

While soy-based polyurethane foams have made inroads into various polyurethane foam markets, the use of soy-based polyurethane foam has not gained acceptance in the automotive industry because of certain limitations. One primary limitation of using soy-based polyurethane foams is the unpleasant vegetable oil odor that is prominent in these foams. This limitation is especially acute in the vehicle interior, where controlled air quality and odor are important issues for automobile consumers. In addition, the heated environment of the cabin interior provides additional limitations on the types of materials that can be used.

Commercially-available soy polyols contain low molecular weight species, for example, aldehydes and hydroperoxides, that contribute to the unpleasant odor emanating from the resulting soy-based polyurethane foams. These low molecular weight species can be formed when the soy oil is heated to elevated temperatures. Soy polyol suppliers have attempted to address this problem by masking the unpleasant odor with other chemicals, for example, fragrances. However, these techniques have not satisfactorily addressed the odor problem issue. Alternatively, a few soy polyols suppliers offer expodized soy polyols, which result in a reduction in unpleasant odor compared to other soy polyols. However, these expodized soy polyols come at a premium price compared to non-expodized soy polyols.

Accordingly, it is desirable and there is a need to provide soy-based polyurethane foam having an acceptable level of odor, and method to produce the same. Moreover, it is also desirable to provide an odor barrier for encapsulating the odor emanating from a soy-based polyurethane foam within a confined volume, and method to produce the same.

SUMMARY

One aspect of the present invention is a vegetable-based polyurethane foam having an acceptable level of odor, and a method of producing the same. Another aspect of the present invention is an odor barrier for encapsulating the odor emanating from a vegetable-based polyurethane foam within a confined volume, and method to produce the same.

According to one embodiment of the present invention, a cellular material prepared by reacting a vegetable-based polyol and an isocyanate is disclosed. The vegetable-based polyol is made from a vegetable oil exposed to ultraviolet (UV) light, wherein a free radical oxidation reaction is catalyzed by the UV light and the vegetable oil is converted into the vegetable-based polyol.

According to another embodiment of the present invention, a composition suitable for making a cellular material is disclosed. The composition includes a vegetable-based polyol and an isocyanate. The vegetable-based polyol is a vegetable-based polyol made from a vegetable oil exposed to ultraviolet (UV) light, wherein a free radical oxidation reaction is catalyzed by the UV light and the vegetable oil is converted into the vegetable-based polyol.

In one embodiment of the present invention, a cellular material is disclosed which includes vegetable-based foam and a number of aldehyde and ketone compounds. The number can be in the range of 1 to 10.

In another embodiment of the present invention, a vegetable-based polyol is disclosed. The vegetable-based polyol can include a first number of oil products, a second number of volatile by-product compounds, and a third number of non-volatile by-product compounds. The first number can be in the range of 1 to 3. The second number can be in the range of 1 to 10. The third number can be in the range of 1 to 5. In certain embodiments, each oil product contains a mixture of difunctional hydroxylated vegetable oil and monofunctional hydroxylated vegetable oil.

According to yet another embodiment of the present invention, an apparatus for use in encapsulating automotive interior components at least partially comprised of cellular material is disclosed. The apparatus includes an odor barrier layer for encapsulating the cellular material to confine odors emanating from the cellular material.

BRIEF DESCRIPTION OF THE DRAWINGS

The features of the present invention which are believed to be novel are set forth with particularity in the appended claims. The present invention, both as to its organization and manner of operation, together with further objects and advantages and features thereof, may be best understood with reference to the following description, taken in connection with the accompanying drawings.

DETAILED DESCRIPTION

Figure 1:
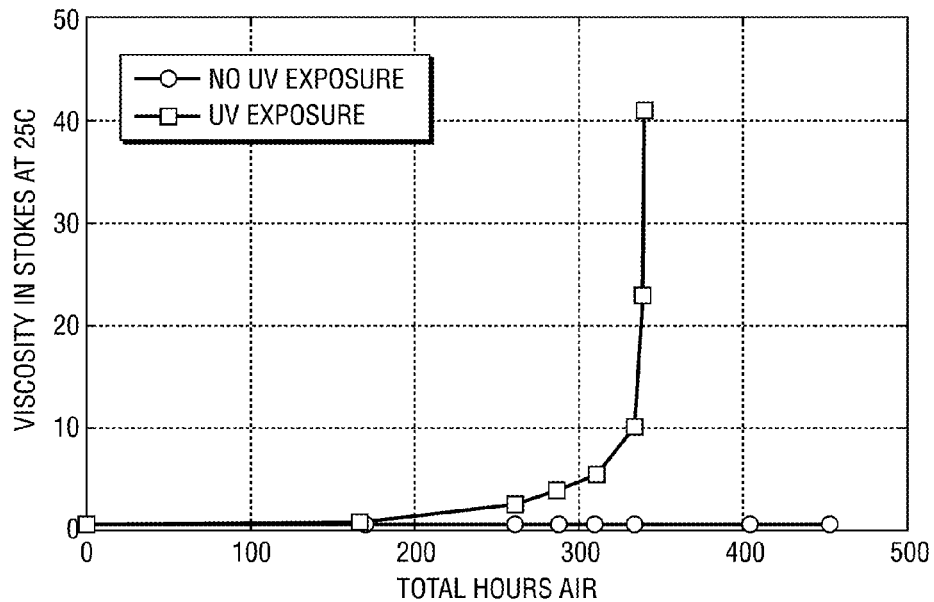
FIG. 1 is a graph comparing the viscosity in stokes at 25 C versus total hours air for an ultraviolet (UV) light trial and a non-UV light trial.

As required, detailed embodiments of the present invention are disclosed herein. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ aspects of the present invention. Moreover, except for otherwise expressly indicated, all numeral quantities in this description indicating amounts of material are to be understood as modified the word "about" in describing the broadest scope of the invention. Practice within the numerical limit stated is generally preferred.

Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with at least one aspect of the invention implies that mixtures of any two or more of the members of the group or class are equally suitable; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

The present invention relates to making a vegetable-based cellular material, such as polyurethane foam, having reduced levels of detectable odors. The polyurethane foam can be prepared by reacting what is known in the art as an A-side reactant with what is known as a B-side reactant. The A-side reactant is generally considered to include an isocyanate, such as disocyanate, or a mixture of, isocyanates. The diisocyanates typically used are diphenylmethane disocyanate (MDI) or toluenediisocyanate (TDI). Of course it should be understood that the particular isocyanates chosen depends upon the particular final physical properties desired in the urethane.

The B-side reactant generally comprises a solution of isocyanate-reactive component, such as polyether polyol or polyester polyol, cross-linking agent, and blowing agent. A gelling and blowing catalyst can also be added to the B-side to control reaction speeds and affect final product quality.

In at least one aspect of the present invention, the isocyanate-reactant component comprises a modified vegetable oil. Any suitable bio-based oil, particularly vegetable oils, through which air has been passed, functionalize the oil with hydroxyl (—OH) groups may be used in the practice of the present invention. Examples of suitable bio-based oils which may be used in the present invention after being blown include: vegetable or seed oils such as soy bean oil, rapeseed oil, or canola oil, peanut oil, cotton seed and/or sunflower oil, olive oil, grape seed oil, linseed oil, and castor oil; fish oils and oils derived from animal fats. In certain embodiments, soybean oil and corn or cottonseed oils are preferred. In other embodiments, soy bean oil is particularly preferred. Such blown oils are described in U.S. Pat. Nos. 6,180,686 and 6,624,244 and are commercially available under Urethane Soy Systems Company (USSC) under the name SoyOyl® and Soyol®. In at least one embodiment, Soyol® P38N is a preferred soy-based polyol.

It should be understood that a vegetable-based oil can be mixed with a synthetic oil, for example, a petroleum oil, to produce a blended natural-synthetic oil as the isocyanate-reactant component. For instance, the synthetic oil can be present in a volume percentage of about 0 to 50% of the total volume of the blended oil.

For example, a polyol using soybean oil as the backbone has been synthesized. This polyol is suitable for making polyurethane foam. The soy polyol contains secondary hydroxyl groups, which are added at the double bonds. This polyol can be used to produce a low-odor foam.

In certain embodiments, the soybean oil is a triacylglyceride with a fatty-distribution of approximately 23.4% oleic acid (18C:1 double bond); 53.2% linoleic acid (18C:2 double bonds); 7.8% linolenic acid (18C:3 double bonds); 11% Palmitic (16C:0 double bonds); and 4% steric acid (18C:0 double bonds).

A detailed description of the components and methods of making flexible, polyurethane foam suitable for automotive applications is disclosed in U.S. patent application Ser. No. 11/160,297, which is hereby incorporated by reference in its entirety.

One aspect of the present invention recognizes that at least two key components impact the detectible odor of polyurethane foam: (1) initial odor of "green", (newly synthesized)

foam, and (2) odor stability in an aged foam. In certain embodiments, limiting the detectible odor over both time frames, i.e. short (addressing issue (1)) and long (addressing issue (2)), can be important for automotive interior applications. The detectible odor emanates from volatile compounds that escape the polyurethane foam in gaseous form. Volatile compounds (otherwise referred to as "volatiles") include, but are not limited to, low molecular weight species, for example, aldehydes and ketones.

According to one embodiment of the present invention, a process for manufacturing soy polyol is disclosed in which the use of a synthesized soy polyol results in a soy-based polyurethane foam having a reduced level of detectible odor.

The soy polyol manufacturing process can include the step of exposing the soy oil to ultraviolet (UV) light to catalyze the oxidation reaction, by generating free radical initiators to begin the process of converting the soy oil to soy-based polyol, i.e. adding hydroxyl groups to the soy oil. Non-limiting examples of UV light sources include an external UV lamp and an immersible UV lamp. In certain embodiments, the wavelength of the UV light is in the range of 360 to 290 nanometers. Non-limiting examples of oils that can be exposed to UV light, to catalyze the polyol reaction, include soybean, corn, cottonseed, vegetable and seed oils.

In this embodiment, the UV exposure step is accompanied by blowing gas, for example, air or oxygen, through the soy oil. By using UV light exposure (with blowing gas), the amount of heat added to the oil to start the conversion process is reduced in comparison to conventional processes. In certain embodiments, a relatively small amount of heat is used to catalyze the reaction to initiate the conversion of oil to polyol. In such embodiments, the amount of heat added yields an oil temperature in the range of 25 C to 45 C. Once the oxidation is initiated, the heat source can be removed, and further conversion can be accomplished through UV light solely. Soy polyols created by UV exposure can be tailored to have desired hydroxyl numbers and viscosities.

Several experiments were conducted to confirm the positive effect of the UV exposure and blowing gas step. The results of these experiments are provided below in Examples 1 through 4.

Soy-based polyurethane foams synthesized using soy-based polyols with reduced odor-causing low molecular weight species were subjected to odor tests. For example, the soy-based polyurethane foams were subjected to a hot odor test using SAE J1351. According to this testing standard, a ranking scale is used to categorize the magnitude of odor emanating from the foam: (1) no noticeable odor; (2) slight, but noticeable odor; (3) definite odor, but not strong enough to be offensive; (4) strong offensive odor; and (5) very strong offensive odor. The results of these tests are provided below in Examples 5 through 7.

The soy polyol manufacturing process can include the step of stripping the soy polyol of low molecular weight species prior to the foaming process. For instance, a vacuum stripping technique can be utilized, such as a wiped film evaporator method, to separate volatiles from the polyol. According to one such method, the soy polyol can be introduced into a heated cylindrical vacuum chamber and through thin-film wiping or sweeping actions the volatiles vaporize and condense on the inner wall of the vacuum chamber. The condensed liquid, which contains mostly volatile compounds can be removed.

The soy polyol manufacturing process can include the step of adding antioxidants immediately after synthesis and during the reaction of the soy-based polyol and isocyanate to stabilize the resulting soy-based polyurethane foam. Antioxidants may prevent further oxidation across unreacted double bonds in the polyol or foam. This step may decrease the likelihood that aldehydes form. Non-limiting examples of antioxidants that can be used in accordance with the present invention include PUR68 and PUR55, available from Ciba Specialty Chemicals of Charlotte, N.C.

In an alternative embodiment of the present invention, an odor barrier can be utilized to encapsulate the polyurethane foam in order to confine odors emanating from the low molecular weight species. It should be understood that the odor barrier could be used with any foam having odor emanation problems, such as soy-based and petroleum-based polyurethane foams. Applied to the automotive industry, a polyurethane foam can be foamed-in-place as a headrest or other automotive interior component. According to this process, foam is poured into a multi-layered structure shaped in the form of the headrest. One or more of the layers of the multi-layered structure can be an odor barrier. In certain embodiments, the odor barrier is a gas impermeable material, for example, polyester or nylon. In certain embodiments, the gas impermeable layer can be coupled with a layer of heat sealable thermoplastic, for example, polyurethane.

The odor barrier can also be used on petroleum-based headrests and other interior foams, for example seating, in order to improve the interior air quality in the vehicle. By containing the volatile compounds, e.g. low molecular weight species, within the odor barrier, it lessens the chance that the customer will smell or inhale the odor emanating from the polyurethane foams.

Example 1

In one experiment, one (1) liter of cold pressed degummed soy oil, available from the Thumb Oilseed Producers' Cooperative of Ubly, Mich., was placed in a custom blown glass column. This experiment was conducted at room temperature, about 72 F. The quartz column allowed the degummed soy oil to be exposed to all of the UV light. In a first trial, an external UV lamp, available from Philips Electronics North America of New York City, N.Y., generated UV light at a wavelength of 315 nm, which was directed at the glass column. During the UV exposure, air was blown through the degummed soy oil. The results of this trial are found in Table 1 below. A Gardner bubble viscometer was utilized to measure the viscosity in stokes at 25 C. The percent volatiles produced was measured following the Ca2c-25 test method from the American Oil Chemists Society for testing volatiles.

TABLE 1

| Total hours air | Total hours UV | Viscosity in stokes at 25 C. | Percent volatiles produced |
| --- | --- | --- | --- |
| 0 | 0 | 0.5 | 0 |
| 166 | 166 | 0.85 | 0 |
| 261 | 170 | 2.5 | 1.78 |
| 287 | 196 | 4.0 | 2.28 |
| 310 | 219 | 5.5 | 4.23 |
| 334 | 243 | 10.1 | 4.88 |
| 339 | 247 | 23 | 4.57 |
| 341 | 249 | 41 | 5.9 |

In a second trial of this experiment, UV light was not directed at the degummed soy oil. Otherwise, the testing parameters remained the same, e.g., room temperature, glass column, and air blowing. The results of this trial are in Table 2 below.

TABLE 2

| Total hours air | Total hours UV | Viscosity in stokes at 25 C. | Percent volatiles produced |
|---|---|---|---|
| 0 | 0 | 0.5 | 0 |
| 170 | 0 | 0.5 | 0 |
| 261 | 0 | 0.5 | 0 |
| 287 | 0 | 0.5 | 0 |
| 310 | 0 | 0.5 | 0 |
| 334 | 0 | 0.5 | 0 |
| 405 | 0 | 0.5 | 0.12 |
| 453 | 0 | 0.5 | 0.09 |

The comparison of Tables 1 and 2 yields a conclusion that a substantial amount of volatiles is produced from the soy oil by virtue of the UV light exposure. In certain embodiments, the UV exposure step increases the number of hydroxyls in the oil, thereby increasing the viscosity and volatiles in the oil. The graph in FIG. 1 demonstrates that the material exposed to UV light has a rapid increase in hydroxyl number as compared to material that has no UV exposure. This graph can be used to identify the point in the reaction in which OH groups are being added to the oil. According to FIG. 1, this point is at about 200 hours after the start of UV exposure. FIG. 1 also demonstrates that UV exposure can be used to create functionalized OH groups, i.e. polyols.

Example 2

In another series of experiments, one (1) liter of cold pressed degummed soy oil, available from the Thumb Oilseed Producers' Cooperative of Ubly, Mich., was placed in a PYREX column that allowed some UV light to penetrate. UV light from an external UV lamp was directed at the PYREX column. The results of these experiments are found in Tables 3-6 below.

TABLE 3

| UV (nm) | T (F.) | Hrs air | Hrs UV | Vis. in stokes at 25 C. | Percentage Volatiles Produced |
|---|---|---|---|---|---|
| 350 nm | 72 | 120 | 120 | 1.4 | 1.54 |

TABLE 4

| UV (nm) | T (F.) | Hrs air | Hrs UV | Vis. in stokes at 25 C. | Percentage Volatiles Produced |
|---|---|---|---|---|---|
| 315 nm | 72 | 286 | 286 | 12.1 | 4.23 |
| 315 nm | 72 | 309 | 309 | 16 | 4.88 |

TABLE 5

| UV (nm) | T (F.) | Hrs air | Hrs UV | Vis. in stokes at 25 C. | Percentage Volatiles Produced |
|---|---|---|---|---|---|
| 315 nm | 222 | 20 | 20 | 2.25 | — |
| 315 nm | 222 | 25 | 25 | 2.65 | — |
| 315 nm | 222 | 43 | 43 | 4.85 | 0.478 |

TABLE 6

| UV (nm) | T (F.) | Hrs air | Hrs UV | Vis. in stokes at 25 C. | Percentage Volatiles Produced |
|---|---|---|---|---|---|
| 315 nm | 175 | 25 | 25 | 1.25 | — |
| 315 nm | 175 and 72 | 25 @ 175 F. and 72 @ 72 | 25 @ 175 F. and 72 @ 72 | 5.5 | — |

Example 3

In yet another experiment, degummed soy oil was placed in a PYREX column that allowed the passage of some UV light. UV light at 315 nanometers from a UV lamp was directed at the PYREX column. The experiment was conducted at a temperature of about 100 F. The results of this experiment are found in Table 7 below.

TABLE 7

| Total hours air | Total hours UV | Viscosity in stokes at 25 C. | Percentage Volatiles Produced |
|---|---|---|---|
| 0 | 0 | 0.5 | 0 |
| 120 | 120 | 0.5 | 0 |
| 144 | 144 | 0.65 | 0 |
| 168 | 168 | 0.85 | 0.68 |
| 198 | 198 | 1 | 0.752 |
| 217 | 217 | 2.5 | 1.778 |
| 289 | 289 | 6.15 | 3.426 |

Example 4

In another experiment, degummed soy oil was placed in a PYREX column that partially blocked UV light. The PYREX column blocks UV light at 200-315 nm wavelengths. UV light at 315 nanometers imparted from a UV lamp was directed at the PYREX column. The temperature of the degummed soy oil was 100 F. Air was blown through the column during the reaction. The results of this experiment are found in Table 8 below.

TABLE 8

| Total hours air | Total hours UV | Viscosity in stokes at 25 C. | Percentage Volatiles Produced |
|---|---|---|---|
| 0 | 0 | 0.5 | 0 |
| 19 | 19 | 0.5 | 0 |
| 115 | 115 | 0.5 | 0 |
| 139 | 139 | 0.5 | 0 |
| 168 | 168 | 0.55 | 0.13 |
| 187 | 187 | 0.65 | 0.13 |
| 211 | 211 | 0.85 | 0.469 |
| 283 | 283 | 5 | 2.802 |

Figure 2:
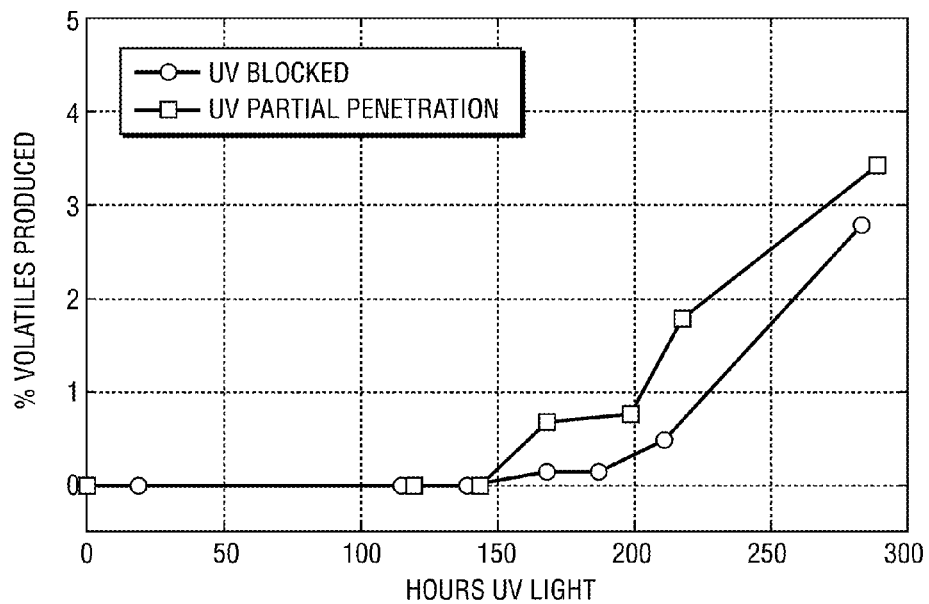
FIG. 2 is a graph comparing percentage volatiles produced following Ca2C-25 test method from the American Oil Chemists Society during heating the polyol versus total hours of UV exposure for a UV light blocked test and a UV partial penetration test.

FIG. 2 is a graph comparing percentage volatiles produced versus total hours of UV exposure for the UV light blocked test and the UV partial penetration test. This graph reflects that percentage volatiles produced is greater for the UV partial penetration test at the same UV exposure duration, indicating increased OH addition.

Example 5

Figure 3:
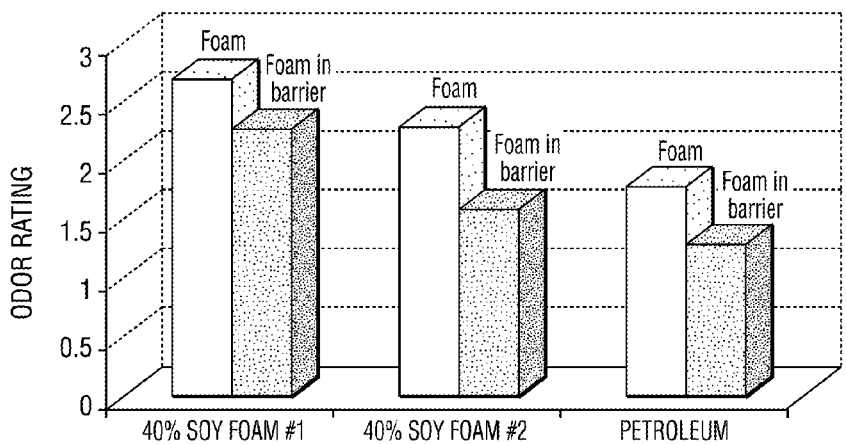
FIG. 3 is a graph comparing the odor ratings for different polyurethane foam types in a barrier versus no barrier.

In this experiment, three different types of polyurethane foam were synthesized: 40% soy foam #1, 40% soy foam #2, and a petroleum foam produced from a petroleum based polyether polyol. Soy foams #1 and #2 are produced with 40% soy polyol and 60% petroleum polyol. Soy foam #1 is produced from R2052B commercial product of blown soybean polyol. Soy foam #2 is produced from R2052 commercial product of blown soybean polyol. The foams, in an exposed state, were tested individually using a hot odor test according to SAE J1351. Each of the foams was encapsulated in an odor barrier fabricated from polyethelene. The foams, covered by the odor barrier, were tested individually using the SAE J1351 test. FIG. 3 is a graph comparing the odor ratings for different polyurethane foam types in a barrier versus no barrier. With respect to the 40% soy foam #1, the exposed foam has an odor rating of 2.6 and the foam in barrier has a reducing rating of 2.2, which represents a 15% reduction in odor. With respect to the 40% soy foam #2, the exposed foam has an odor rating of 2.2 and the foam in barrier has a reducing rating of 2.0, which represents an 11% reduction in odor. With respect to the petroleum foam, the exposed foam has an odor rating of 1.7 and the foam in barrier has a reduced rating of 1.2, which represents a 30% reduction in odor.

Example 6

Figure 4:
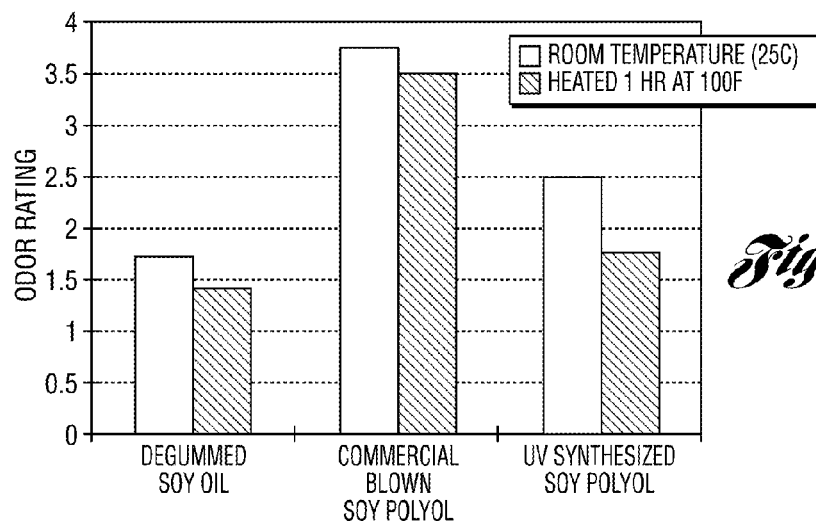
FIG. 4 is a graph comparing the room temperature odor ratings of degummed soy oil, blown soy polyol, and a UV synthesized soy polyol at room temperature and conditioned by heating one hour at 100 F.

In this test, various soy-based materials were tested for odor (using SAE J1351) at room temperature (25 C) and after one (1) hour of heating at 100 F. The soy-based compounds were degummed soy oil, commercial blown soy polyol with no UV exposure, and UV synthesized soy polyol. FIG. 4 is graph comparing the results of this test. The degummed soy oil has odor ratings of 1.7 and 1.4 for the room temperature and heated tests, respectively. The commercial, blown soy polyol with no UV exposure has odor ratings of 3.7 and 3.5 for the room temperature and heated tests, respectively. The UV synthesized soy polyol had odor ratings of 2.5 and 1.7 for the room temperature and heated tests, respectively, as shown in FIG. 4.

Example 7

Figure 5:
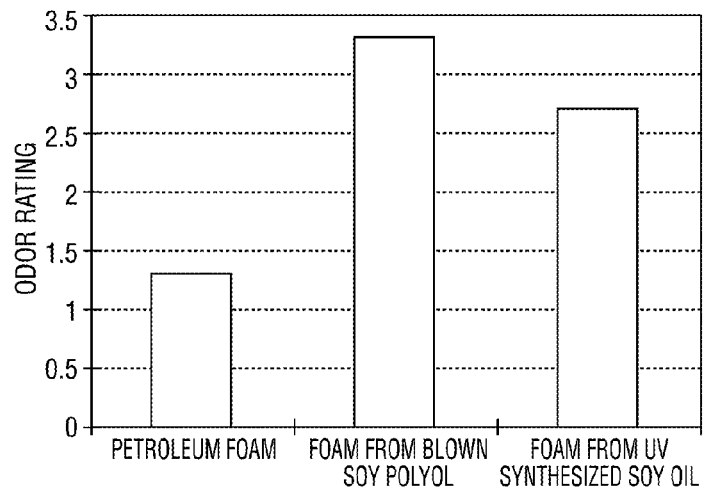
FIG. 5 is a comparison of odor ratings for different polyurethane foam types.

In this test, various polyurethane foam materials were tested for odor (using SAE J1351) at room temperature (25 C). The polyurethane foam materials were petroleum foam; foam from commercial blown soy oil and foam from UV synthesized soy oil. FIG. 5 is graph comparing the results of this test. The petroleum foam has an odor rating of 1.3. The foam from commercial blown soy oil has an odor rating of 3.3. The foam from UV synthesized soy oil has an odor rating of 2.7.

Figure 6:
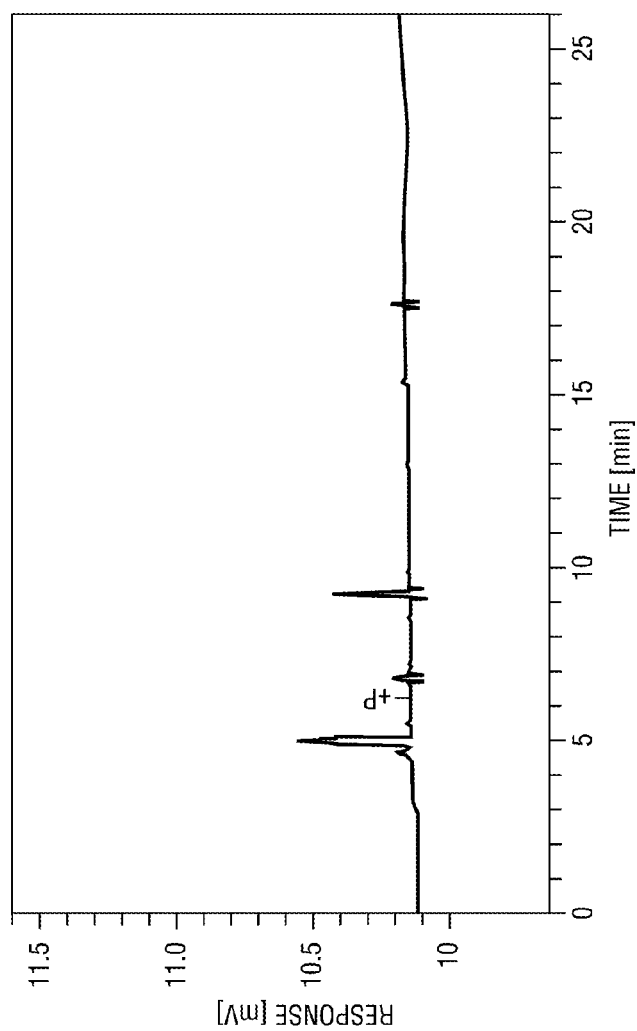
FIG. 6 is a gas chromatogram of a soy polyol synthesized by the UV light-exposing step of one or more embodiments of the present invention.

FIG. 6 is a gas chromatogram of a soy polyol synthesized by the UV light-exposing step of one or more embodiments of the present invention. The gas chromatogram has five peaks, wherein each peak signifies a distinct compound, which can be an oil product, a volatile by-product compound (e.g. aldehyde or ketone), or a non-volatile by-product compound (e.g. a free fatty acid). Each oil product can include a mixture of difunctional hydroxylated vegetable oil and monofunctional hydroxylated vegetable oil.

In FIG. 6, three of the peaks indicate a variety of compounds in the polyol product, which can oil products and/or volatile by-product compounds. In certain embodiments, 10 or less volatile by-product compounds in the soy polyol produce a soy-based foam having a low odor.

While the best mode for carrying out the invention has been described in detail, those familiar with the art to which this invention relates will recognize various alternative designs and embodiments for practicing the invention as defined by the following claims.

What is claimed is:

1. A method comprising:
   blowing a gas through a vegetable-based oil while exposing it to ultraviolet (UV) light and adding heat via a heat source until oxidation of the oil is initiated and then removing the heat source while maintaining the UV light exposure to obtain a reaction product including a vegetable-based polyol and aldehydes and/or ketones; and
   stripping the vegetable-based polyol to remove the aldehydes and/or ketones.

2. The method of claim 1, wherein in the stripping step is carried out using a vacuum stripping technique.

3. The method of claim 1, wherein the stripping step is carried out using a wiped film evaporator technique.

4. The method of claim 1, wherein the blowing gas is air or oxygen.

5. The method of claim 1, wherein the vegetable-based polyol has an odor rating of less than or equal to 2.7 according to the Society of Automotive Engineers SAE J1351 odor test.

6. The method of claim 1, wherein the UV light is at a wavelength of 290 to 360 nanometers.

7. The method of claim 1, wherein the vegetable-based oil is a degummed vegetable-based oil.

8. A method comprising:
   exposing a vegetable-based oil to ultraviolet (UV) light and adding heat via a heat source until oxidation of the oil is initiated and then removing the heat source while maintaining the UV light exposure while blowing a gas through the vegetable-based oil to obtain a reaction product including a vegetable-based polyol and aldehydes and/or ketones;
   stripping the vegetable-based polyol to remove the aldehydes and/or ketones; and
   reacting the vegetable-based polyol with an isocyanate to produce a vegetable-based cellular material.

9. The method of claim 8, further comprising encapsulating the vegetable-based cellular material in an odor barrier.

10. The method of claim 9, wherein the odor barrier is a gas impermeable material.

11. The method of claim 10, wherein the gas impermeable material is a polyester or nylon material.

12. The method of claim 8, wherein the vegetable-based oil is a degummed vegetable-based oil.

13. The method of claim 8, wherein the vegetable-based cellular material is a vegetable-based foam.

14. The method of claim 8, wherein the vegetable-based polyol has an odor rating of less than or equal to 2.7 according to the Society of Automotive Engineers SAE J1351 odor test.

15. The method of claim 1, wherein the UV light is at a wavelength of 290 to 360 nanometers.

16. A method comprising:
   blowing a gas through a soy-based oil while exposing it to ultraviolet (UV) light and adding heat via a heat source until oxidation of the oil is initiated and then removing the heat source while maintaining the UV light exposure to obtain a reaction product including soy-based polyol and aldehydes and/or ketones; and
   stripping the soy-based polyol to remove the aldehydes and/or ketones.

17. The method of claim 16, wherein the soy-based polyol has an odor rating of less than or equal to 2.7 according to the Society of Automotive Engineers SAE J1351 odor test.

18. The method of claim 1, further comprising removing the heat once oxidation of the vegetable-based oil is initiated such that further conversion is accomplished through UV light solely.

19. The method of claim 1, wherein the oil blowing is maintained after removal of the heat source.

20. The method of claim 8, wherein the oil blowing is maintained after removal of the heat source.

* * * * *